United States Patent Office 3,519,501
Patented July 7, 1970

3,519,501
CHROMIC ACID-ORGANIC COATING
COMPOSITIONS
Harvey Stuart Holden, Chesterland, Irving Malkin, University Heights, William Wayne Warner, Painesville, and Alexander W. Kennedy, Chardon, Ohio, assignors to Diamond Shamrock Corporation, Cleveland, Ohio, a corporation of Delaware
No Drawing. Filed Apr. 16, 1968, Ser. No. 721,571
Int. Cl. C23f 7/26; C09d 5/08
U.S. Cl. 148—6.2          10 Claims

ABSTRACT OF THE DISCLOSURE

Corrosion-inhibiting, hexavalent-chromium-containing coating compositions for metal surfaces are prepared with chromic acid in combination with carboxylic acids having one, three, or more carboxyl groups per molecule. These acids are employed along with an additional organic component which may be an amino acid, a carbamoyl-containing hydrocarbon, or a heterocyclic ring compound containing carbon and nitrogen ring atoms. Compositions are cured on metal surfaces at elevated temperature to augment the bonding of the resulting residue to the surface. Surfaces containing typically 5–600 milligrams per square foot of the residue exhibit outstanding corrosion resistance and, for weldable substrates, retain weldability without deleterious degradation of such corrosion resistance.

BACKGROUND OF THE INVENTION

In the copending U.S. application Ser. No. 484,747 of P. R. Cutter and D. N. Hamilton, now Pat. No. 3,382,081 issued May 7, 1968 it has been disclosed that desirable corrosion - inhibiting, hexavalent - chromium-containing coatings are formed with chromic acid solutions wherein substantially all of the chromium is contained as hexavalent chromium, when the solution further contains an organic saturated dicarboxylic acid such as succinic acid. Upon curing applied coatings, e.g., as applied on a metal substrate, the resulting treated metal surface in addition to corrosion resistance may also have enhanced adhesion for subsequently applied paints.

SUMMARY OF THE INVENTION

It has now been found that a particularly desirable combination of such features, e.g., corrosion-resistance with weldability, wherein welding does not deleteriously effect corrosion resistance, can be obtained by supplying a chromic acid liquid medium with other saturated, as well as unsaturated, carboxylic compounds, i.e., mono-, tri-, or polycarboxylic acids, when such acids are present in the bonding coating composition in combination with one or more of particular additional organic substituents. Such newly found coating compositions after application and curing offer excellent resistance for the metal substrate to the deleterious effects of condensing humidity, for example when comparing such protection with that provided by films of the saturated dicarboxylic acid-containing composition from the copending application mentioned above.

Broadly, the present invention is a corrosion-inhibiting, hexavalent-chromium-containing coating composition for metal surfaces which consists essentially of a volatile liquid having dispersed therein: (A) chromic acid in a concentration of between about 1 and 400 grams per liter; and (B) an organic component which is between about 60–90 weight percent of at least one non-aromatic carboxylic compound as defined more particularly hereinbelow, and between about 10–40 weight percent of at least one organic compound from a subsequent group of organic compounds. The non-aromatic carboxylic compounds are selected from the group consisting of carboxylic acids, anhydrides thereof, where such exist, and ammonium salts thereof where such exist, wherein such acids are selected from the group consisting of saturated and unsaturated monocarboxylic acids, saturated and unsaturated polycarboxylic acids having at least three carboxyl groups per molecule, and mixtures thereof.

The organic compounds of the subsequent group, that is, supplying between about 10–40 weight percent of the organic component, are group (a), group (b), or group (c) compounds, or their mixtures. The group (a) compounds are amino acids which are free from hydroxyl, sulfur, or halogen substituents; the group (b) compounds correspond to the structure: R—CONHR' wherein R and R' are the same or different and R is selected from the group consisting of alkyl, cycloalkyl, alkenyl, aryl, carbamyl, alkaryl, carbamyl substituted hydrocarbon, and aralkyl, and R' is selected from the group consisting of alkyl, cycloalkyl, hydrogen, alkenyl, aryl, alkaryl, and aralkyl.

The group (c) compounds are heterocyclic ring compounds containing at least one nitrogen atom and at least one carbon atom, with the remaining ring atoms being selected from the group consisting of carbon and nitrogen. Moreover, in the group (c) compounds each substituted ring nitrogen atom bears a radical represented by R' as defined hereinabove, and ring carbon atoms bear radicals selected from the group consisting of alkoxy, oxo, amino, R' as defined hereinabove, and the radical of the formula

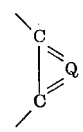

wherein the carbon atoms are heterocyclic ring carbon atoms and taken together with Q complete an aromatic ring. Furthermore, the total weight of compounds from the (B) organic component is from about 1 to 100 grams per liter of coating composition, with the mole ratio of $CrO_3$ to the total of such (B) component being within the range of about 5:1 to about 0.7:1.

Additionally this invention relates to a method for protecting metal substrate surfaces with an adherent, corrosion-resistant, hexavalent-chromium-containing coating composition, and further relates to articles thus prepared.

DESCRIPTION OF THE PREFERRED EMBODIMENTS

The hexavalent-chromium-containing coating compositions of this invention are often referred to herein, for convenience, simply as "coating compositions," or as "chromic acid compositions," or, because of the adherency of resulting residues to a metal substrate after curing, as a "bonding coating composition." The metal substrate surfaces which can be protected by such coating compositions include any such substrates which are, or may be, protected by a hexavalent-chromium-containing coating composition. For example, such metal substrate surfaces include aluminum and alloys thereof, zinc and zinciferous substrates, copper and cupriferous substrates, e.g., brass and bronze, as well as cadmium, titanium, nickel and its alloys, tin, lead chromium, magnesium and alloy thereof, and for weldability, preferably a ferrous substrate, e.g., iron, stainless steel or steel such as cold rolled steel.

The chromic acid is present in the composition to the extent of about 1 to 400 grams per liter and generally about 30–45 grams per liter. It is to be understood that a minor amount of the chromic acid may be supplied by ammonium dichromate for the purposes of the invention. Moreover, lesser amounts of other water soluble salts of chromic acid, e.g., sodium dichromate, can be present in the composition for supplying a portion only of hexavalent chromium; but, after curing of the applied composition, a water rinse should be employed to enhance the corrosion resistance of the final coated surface.

For economy, water is the preferred liquid dispersion medium. When water is employed, essentially all of the compositions of this invention are solutions and water is the composition solvent. However, when materials such as water dispersible polyacrylic acids are present in water-based compositions, the resulting material is a dispersion and hence the term "dispersion" is employed herein for convenience to refer to both composition solutions as well as such dispersions. However, for many substituents which are only sparingly soluble in water, a nonaqueous liquid, in which both chromic acid and the total organic component of the solution are soluble, which liquid must also be one that is not readily oxidized by chromic acid, may be used. Tertiary butyl alcohol is the preferred organic liquid, readily dissolving the chromic acid, and, for example, many higher molecular weight compounds, as well as being relatively stable in aqueous chromic acid solutions at ordinary temperature encountered during application and/or storage of the bonding coating composition. Other alcohols are less desirable because of the limited solubility of chromic acid therein or because they are readily oxidized by the chromic acid. Advantageously, the liquid employed is a "volatile liquid," i.e., has a boiling point of about 100° C. or less at a pressure of 760 mm. Hg, to permit rapid drying of the applied coating composition.

The organic component is between about 60–90 weight percent of at least one non-aromatic carboxylic compound which may be a mono-, tri-, or polycarboxylic acid. Less than about 60 weight percent of these compounds in the organic component can lead, after curing, to the presence on the metal substrate of a coating residue having undesirable adhesion to the substrate, i.e., such residue as is obtained after application of the coating to the substrate surface and heating of same. Moreover, these compounds are present in the organic component in an amount of less than about 90 weight percent, based on the total weight of this component, to augment coating durability and to provide coated substrate exhibiting suppressed liberation of unwanted chromium, which is more particularly defined hereinbelow.

The useful saturated monocarboxylic acids, which are not branched chain or alicyclic, are essentially always the $C_2$–$C_{30}$ fatty acids and most usually are those which are readily commercially available, e.g., capric, caprylic, stearic, and palmitic, which can be mixtures of such acids often containing 40 weight percent up to 90 weight percent or more of the principle acid in mixture typically with other fatty acids, but sometimes also mixed with minor amounts of unsaturated aliphatic fatty acids. Preferably, the fatty acid is a $C_3$–$C_{10}$ fatty acid for augmented adhesion of the coating composition residue to the substrate.

Additional saturated monocarboxylic acids include aliphatic branched chain monocarboxylic acids, for example, isovaleric, pivalic, 2-methylbutanoic, a-ethylcaproic diethylmethylacetic, and their mixtures, and also such acids include alicyclic monocarboxylic acids, e.g., cyclopropanoic, cyclopentanoic, chaulmoogric, and mixtures thereof.

Suitable saturated polycarboxylic acids include tricarboxylic acids having at least five carbon atoms, and such acids which can or have been used in the practice of this invention include tricarballylic acid, 1,3,5-tricarboxypentane, and their mixtures. In addition to these trifunctional acids, the useful saturated polycarboxylic acids include acids having an average of more than three carboxyl groups per molecule and which may be aliphatic, e.g., linear, or alicyclic, e.g., crosslinked, including polyacrylic acids which can be water soluble or water dispersible, as well as water soluble ethylene-maleic anhydride copolymers, i.e., linear acids of same as well as linear crosslinked anhydrides thereof.

Furthermore, the carboxylic compound for the organic component can be made up with an unsaturated monocarboxylic acid which may be a monoethenoid fatty acid, for example, caproleic, 10-undecylenic, oleic, elaidic, erucic, brassidic, and their mixtures. Such unsaturated monocarboxylic acids can also be di-, tri-, and polyethenoid fatty acids, for example, sorbic, linoleic, linolenic, arachidonic, and their mixtures. Moreover, these unsaturated monocarboxylic acids may be ethynoid fatty acids such as stearolic and behenolic. Preferably, for enhanced coating durability for the coating composition residue the ethynoid fatty acids are such acids containing more than about six carbon atoms.

Other acids which can make up the carboxylic compound portion of the organic component include unsaturated polycarboxylic acids, for example aconitic acid and the so-called "trimer" acids. Such trimer acids are mixtures of dimer and trimer acids but are preponderantly, e.g., 75–80 weight percent, trimer acids, i.e., tri-carboxylic acids, and are ostensibly unsaturated, being formed by the polymerization of generally $C_{18}$ unsaturated fatty acids. Additional polycarboxylic acids are those having an average of more than three carboxyl groups per molecule such as polymerized maleic acid.

It is to be understood that for all of the foregoing carboxylic acids, such acids can be furnished in the coating composition in the form of their anhydride precursors where such exist. Moreover, the ammonium salts of such acids may also be employed in like manner where such exist. Thus, as used herein, the term "carboxylic acid" is means to include the respective anhydride and/or ammonium salt of such acid.

The balance of the organic component, that is, about 10–40 weight percent of the organic component is supplied by compounds which include aminoacids free from sulphur, hydroxyl, or halogen substituents. By the use of the term "amino acids" herein meant an organic carboxylic acid in which a portion of the non-acid hydrogen has been replaced by one or more amino nitrogens, i.e., has been replaced by at least one nitrogen having two hydrogen substituents, as for example in the amino acid alanine, or by at least one nitrogen having only one hydrogen substituent, for example, the ring nitrogen in the amino acid proline. It is not contemplated to use amino acids containing sulfur such as the amino acid methionine, or to use such acids containing hydroxyl groups as in serine, or such compounds having halogen substituents, e.g., the iodine-containing amino acid thyroxine. Coating compositions containing such acids can be deleteriously oxidized by chromic acid and may offer retarded corrosion resistance for substrate surfaces.

The suitable amino acids for the practice of this invention are chiefly the alpha-amino acids and these acids include monoamino-monocarboxylic acids such as valine, monoamino-dicarboxylic acids, as for example aspartic acid, diamino-monocarboxylic acids, e.g., lysine, as well as heterocyclic amino acids such as histidine. Also, the amino acids can be beta-amino acids, for example beta-alanine, or beta-amino hydrocinnamic acid, or gamma-amino acids such as gamma-amino butyric acid, or a delta-amino acid such as delta-amino valeric acid, or mixtures of any such amino acids. Suitable amino acids which can or have been used in the coating composition in addition to those mentioned hereinabove include glutamic acid, phenylalanine, N-ethyl glycine, histidine, glycine, and arginine. Some or all of these compounds may be furnished by their hydrochloride salts where such exist, for example glycine hydrochloride.

The balance of the organic component, i.e., the about 10–40 weight percent of such component can also be supplied by compounds of the structure R—CONHR′ wherein R and R′ are the same or different and are alkyl, alkenyl, cycloalkyl, alkaryl, aryl, or aralkyl. The alkyl and alkenyl, are typically lower alkyl and lower alkenyl, i.e., are radicals of usually six carbon atoms or less. Also, R′ can be hydrogen and R can be carbamyl, or carbamyl substituted, or carboxyl substituted, hydrocarbon, i.e., a hydrocarbon as defined hereinabove for R but having a carbamyl or carboxyl substitutent. Useful compounds represented by this structure thus include methacrylamide, acrylamide, propionamide, N-phenylpropionamide, N-methylacetamide, succinamide, oxamide, hexaneamide, succinamic acid, N-methylhexaneamide, benzamide, N-ethylbenzamide, N-phenylbenzamide, and their mixtures.

Additionally, the balance of the organic component can be made up from heterocyclic ring compounds having at least one of the ring atoms being nitrogen and one being carbon and the remaining ring atoms being carbon and/or nitrogen. Moreover, each ring carbon can bear an alkoxy, oxo, or amino radical or such radical as defined for R′ hereinbefore. Additionally, two adjacent heterocyclic ring carbon atoms can form a radical of the formula

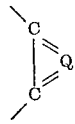

wherein such carbon atoms taken together with Q complete an aromatic ring, such as in the compounds carbostyril and phthalimidine. Each substituted heterocyclic ring nitrogen atom, i.e., the nitrogen atoms may be unsubstituted, can have a radical as represented by R′ as defined hereinabove.

Typically such heterocyclic ring compounds have five to seven atoms in the heterocyclic ring. In addition to the heterocyclic ring compounds mentioned hereinabove, suitable such compounds which can or have been used in the practice of the present invention include pyrazole, 4-methoxypyridine; barbituric acid, succinimide, isatin, uramil, oxindole, uracil, 1,2,4-triazole, 2,5-piperazinedione, pyrrole, caprolactam, N-methylisatin, N-ethylpyrrole, gamma-butyrolactam, 2-pyrrolidone, p-methylisatin, delta-valerolactam, 6-methyl-2-piperidone, omega-lauric lactam, and mixtures of same.

The total organic component, regardless of composition, should be present in the bonding coating composition, in an amount between about 1 and about 100 grams per liter of such composition. The presence of less than about 1 gram per liter of such component in the chromic acid composition is uneconomical since it requires the evaporation of large amounts of solvent. Using more than about 100 grams of organic component per liter of bonding coat composition may cause undesirable solubility problems when water alone is the volatile liquid and additionally can lead to some sacrifice in the adhesion of subsequently applied paints. Preferably for good paint adhesion and economy, the coating composition contains between about 20–65 grams of organic component per liter.

Additionally the molar ratio of $CrO_3$ to the total organic component should be within the range of about 5:1 to about 0.7:1. A molar ratio of chromic acid to the total organic component of greater than about 5:1 may provide unwanted chromium in the resulting residue, that is chromium present in the residue from the coating composition which can be liberated if a water wash is applied to the film. A mole ratio of less than about 0.7:1 for the chromic acid to the organic component can provide cured films containing insufficient chromium for enhanced corrosion resistance. Preferably for enhanced corrosion resistance without the substantial formation of unwanted chromium in the cured film, the composition contains a molar proportion of $CrO_3$ to the organic component within the range of about 3:1 to 1.5:1.

In addition to the substituents discussed hereinabove, the chromic acid composition may contain a non-ionic wetting agent such as alkylphenoxypolyoxyethylene ethanol, e.g., commercial nonylphenoxypolyoxyethylene ethanol, in concentrations typically up to about 3 grams per liter of the composition.

Before applying the coating composition to the substrate, it is desirable that the substrate be thoroughly cleaned. The use of a commercial alkaline cleaning composition which combines washing and mild abrasive treatments can be employed for this purpose, e.g., an aqueous trisodium phosphate-sodium hydroxide cleaning solution. In addition to cleaning, the substrate can undergo cleaning plus etching, e.g., with hydrofluoric acid etching agent. To accomplish the substrate etching and instead of applying only the chromic acid solution, a mixture can be applied which incorporates an etching agent in with the chromic acid composition. In lieu of a clean metal surface, an additional suitable surface for applying the coating composition is one wherein the metal substrate has been treated to exhibit a loose, powdery residue which is retained on the substrate for subsequent application of the coating composition. Such residues can promote adhesion for later applied paints.

Whether applied alone or in mixture with an etching agent, the coating composition may be applied to the substrate by any of the various methods for applying paint to a metallic substrate, for example, dip coating, roller coating or reverse roller coating, curtain coating, airless spray, rotary brush coating, pressure spray, or combinations of such methods such as spray and brush techniques. The chromic acid composition can be suitably applied as a "mill finish," i.e., factory applied. For economy, these compositions are applied in an amount yielding, after curing, below about 600 milligrams of coating residue per square foot of substrate metal and, advantageously, for enhanced adhesion of subsequently applied and cured topcoatings, are applied in an amount to yield at least about 5 milligrams per square foot of such residue. Preferably, for best economy with excellent adhesion, the coating composition is applied in an amount between about 30–100 milligrams per square foot.

After application of the chromic acid composition, the substrate is heated, such as by infrared baking, at a substrate temperature, and for a period of time, sufficient to vaporize volatile solvent in the composition and deposit on the surface a composition residue which is most often at least substantially water insoluble, as well as adhering, i.e., "bonded," to the surface. After heating, the substrate surface is ostensibly dry to the touch, and the residue sufficiently bonded to the surface to withstand typically at least about two inch-pounds of impact without removal of coating to bare metal on the convex (reverse) surface. For such impact testing a metal ram of specified weight, in pounds, with a hemispherical contact surface is allowed to drop on the coated panel from a predetermined height, in inches.

Heating may be initiated essentially as soon as the composition is applied, for example, baking at a substrate temperature of 400° F. or greater within 10 seconds or less of application. Generally, however, especially for factory applied compositions, air drying, e.g., within the temperature range from about 65° to about 200° F. and for a time of a few minutes or less, will precede heating. The resulting material, after such air drying, is then usually baked, especially for the water based coating compositions, by raising the substrate to a temperature advantageously within the range from about 240° to about 550° F. Temperatures below about 240° F. can often provide for prolonged, inefficient curing while temperatures above about 550° can result in some final film degradation. The substrate is heated within the above temperature range for at least about 5 seconds, but, for economy, the heating is not continued for substantially more than about 10 minutes. Curing for less than about 5 seconds can be insufficient to prepare a tough, adherent undercoating.

The preferred baking temperature varies somewhat according to the particular coating composition used. For efficiency, infrared or radiant heat is preferred. In the circumstances in which tertiary butyl alcohol is used as a coating composition medium, a substrate baking temperature of about 210°–340° F. is sufficient. When water alone is used, a higher temperature of preferably about 350°–400° F. can be employed. Water and tertiary butyl alcohol can be used together as a mixed composition medium, in which case the baking temperature is preferably within the range of about 350°–400° F.

After the coating composition is cured and the substrate cooled a weldable primer may be applied where a topcoating is desired but weldability is to be retained. Such weldable primers can contain a particulate, electrically conductive pigment of aluminum, copper, cadmium, carbon, zinc, or magnetite, i.e., the magnetic oxide of iron and their composition and use with coating compositions has been more fully disclosed in copending U.S. application Ser. No. 642,133 of B. E. Palm and E. W. Harwell. Additional topcoatings include any suitable paint, i.e., a paint, other primer, enamel, varnish, or lacquer. Such paints can contain pigment in a binder or can be unpigmented, e.g., generally cellulose lacquers, rosin varnishes, and oleoresinous varnishes, as for example tung oil varnish. The paints may be solvent reduced or they can be water reduced, e.g., latex or water-soluble resins, including modified or soluble alkyds, or the paints may have reactive solvents such as in the polyesters or polyurethanes. Additional suitable paints which can be used include oil paints, including phenolic resin paints, solvent-reduced alkyds, epoxys, acrylics, vinyl, including polyvinyl butyral and oil-wax-type coatings such as linseed oil-paraffin wax paints. The paints can be applied as mill finishes.

When reference is made herein to welding of the substrate, it is to be understood that the subsequent welding under consideration can be spot welding, i.e., localized electrical resistance welding, or seam welding such as with roller electrodes. Typically spot welding can be performed with copper electrodes at electrode pressures from about 100 to about 5,000 pounds, and at 4–5 volts and about 10,000–17,000 amps operating conditions, with a weld time, in cycles, from about 4 to about 400 based on a 60 cycle frequency.

The following examples show ways in which the invention has been practiced but should not be construed as limiting the invention. In the examples the following procedures have been employed.

Preparation of test panels

Steel test panels (4" x 12", and all being cold rolled, low carbon steel panels) are prepared for coating application by typically immersing in water which has incorporated therein 4 ounces of cleaning solution per gallon of water. The cleaning solution is 25% by weight of tetrasodium pyrophosphate, 25% by weight of disodium phosphate, and the balance sodium hydroxide. The bath is maintained at a temperautre of 160°–180° F. After dipping, the panels are rinsed with warm water while scrubbing with a soft bristle brush. These panels are designated "bare steel" panels in the examples.

Application of coating composition and curing

Unless otherwise indicated in the examples, the coating composition is applied by dipping the test panel into such composition, removing and draining excess composition from the panel, air drying at room temperature until the coating is dry to the touch and baking under infrared lamps or baking in a convection oven at a substrate temperature up to 450° F. for a time up to 6 minutes.

Corrosion resistance test (ASTM B–117–64)

Corrosion resistance of coated panels is measured by means of the standard salt spray (fog) test for paints and varnishes, ASTM B–117–64. In this test, panels are placed in a chamber kept at constant temperatures where they are exposed to a fine spray (fog) of a 5% salt solution for specified periods of time, rinsed in water and dried. The extent of corrosion and film removal on the test panels can then be measured in inches of coating failure away from scribe lines as explained in more detail hereinafter in the examples.

Condensing humidity test

Water is heated and mechanically circulated in the bottom of a cabinet to produce a condition of 100% humidity in the cabinet and a temperature for the ambient steam within the cabinet of 120° F. Panels are placed in the cabinet at about a 15° angle to the water surface; the bottom edge of the panel is about 8 inches above the water surface and the top edge about 10 inches above the water surface. To terminate the test, panels are simply removed from the cabinet, air dried and visually inspected for coating failure, e.g., blisters and pin hole rust spots, on the face of the panel, that is, not around the panel edges.

Paint films

The paint films (topcoats) referred to in the examples are from a commercial white alkyd enamel topcoat which is applied to the panels by dipcoating. This alkyd paint is prepared from a modified alkyd resin based upon a system of partially polmerized phthalic acid and glycerine. The paint contains 50 weight percent solids and has a viscosity of 50 seconds as measured on a No. 4 Ford cup at 70° F. After coating panels with the enamel, the coating is cured by baking in a convection oven for 20 minutes at a temperature of 320°–325° F.

*Example 1.*—In Table 1 below, the results of the condensing humidity test is presented for coating compositions of the present invention together with a chromic acid-adipic acid-succinimide composition which is included for a basis of comparison with the compositions of the present invention. All of the coating compositions are solutions, with the solvent being shown in the table below, and each solution contains about 0.2 millimeter, per liter of composition, of a nonionic wetting agent bearing a nonyl phenyl hydrophobe and having an HLB No. of 16, a solidification temperature of 37° C., and an apparent specific gravity of 4°/20° C. of 1.077.

All compositions are applied to bare steel panels and cured in the manner described hereinabove and the surface condition prior to application is shown in the table. Where slight coating failure has been noted in the table, this typically refers to some pinpoints of red corrosion around a half-inch width at the edge of the panel face combined with a rust-free condition on the balance of the panel face, or some pinpoint corrosion on the face with an essentially rust-free panel. Medium coating failure refers to a condition of more aggravated apparent corrosion as well as more extensive distribution of corrosion failure over the surface of the panel.

TABLE I

| Solvent | Ingredients | Concentration, g./l. | Condensing humidity |
|---|---|---|---|
| $H_2O$ | $CrO_3$ | 40 | 91.5 hours, medium failure (3 hours, initial trace failure). |
|  | Adipic acid | 20 |  |
|  | Succinimide | 10 |  |
| $H_2O$ | $CrO_3$ | 40 | 120 hours, slight failure. |
|  | Octric acid | 20.7 |  |
|  | Succinimide | 7.5 |  |
| $H_2O$ | $CrO_3$ | 40 | 192 hours, slight failure. |
|  | Octric acid | 25.9 |  |
|  | Pyrazole | 5.1 |  |
| t-Butyl alcohol. | $CrO_3$ | 40 | 168 hours, slight failure. |
|  | Stearic acid [1] | 72.8 |  |
|  | Succinomide | 14.0 |  |
| Do | $CrO_3$ | 40 | 168 hours, no failure. |
|  | Octanoic acid | 36.8 |  |
|  | Succinimide | 14.0 |  |
| $H_2O$ | $CrO_3$ | 40 | 48 hours, no failure. |
|  | Propionic acid | 18.96 |  |
|  | Propionamide | 10.12 |  |
| $H_2O$ | $CrO_3$ | 40 | 144 hours, no failure. |
|  | 1,2,3-propanetricarboxylic acid. | 15.14 |  |
|  | Succinimide | 4.76 |  |
| $H_2O$ | $CrO_3$ | 40 | 9 hours, no failure. |
|  | Propionic acid | 11.2 | 24 hours, initial failure. |
|  | Succinimide | 8.8 |  |
| $H_2O$ | $CrO_3$ | 40 | 9 hours, no failure. |
|  | Propionic acid | 11.2 | 24 hours, initial failure. |
|  | Gamma-butyrolactam. | 6.4 |  |
| $H_2O$ | $CrO_3$ | 40 | 8 hours, initial, trace failuer. |
|  | Propionic acid | 18.8 |  |
|  | Aspartic acid | 10.1 |  |

[1] A U.S.P. grade of stearic acid which is a hard, somewhat glossy crystalline solid, practically insoluble in water and consisting chiefly of stearic and palmitic acids.

As is seen from the above table, all tested compositions of the present invention shown hereinabove outperform the comparative chromic acid-adipic acid-succinimide composition under the conditions of condensing humidity.

Example 2.—In Table II below, data from the salt spray test are set forth for coating compositions of the present invention and a comparative chromic acid-adipic acid-succinimide coating composition. The wetting agent of Example 1 is present in all compositions in an amount of about 0.2 milliliter per liter. Compositions, employing solvents which have been shown in the table below, are applied to bare steel panels and cured in the manner described hereinbefore except for the chromic acid-octric acid-succinimide composition which is dried immediately after coating with infrared lamps for seven seconds and then cured. Paint films of the enamel topcoat are formed on each panel as described hereinabove. The figures presented in the table, e.g., "0/32", indicates the inches of coating failure away from scribe lines which have been cut through to the steel, in an X configuration on the panel surface, prior to subjecting the panels to the test.

TABLE II

| Solvent | Ingredients | Concentration, g./l. | Salt spray, 168 hours |
|---|---|---|---|
| $H_2O$ | $CrO_3$ | 40 | 2/32 |
|  | Adipic acid | 20 |  |
|  | Succinimide | 10 |  |
| $H_2O$ | $CrO_3$ | 40 | 0/32 |
|  | Octric acid | 20.7 |  |
|  | Succinimide | 7.5 |  |
| $H_2O$ | $CrO_3$ | 40 | 0/32 |
|  | Octric acid | 25.9 |  |
|  | Pyrazole | 5.1 |  |
| t-Butyl alcohol. | $CrO_3$ | 40 | 0/32 |
|  | Propionic acid | 18.96 |  |
|  | Succinimide | 7.6 |  |
| Do | $CrO_3$ | 40 | 0.5/32 |
|  | Octanoic acid | 36.8 |  |
|  | Succinimide | 14.0 |  |
| Do | $CrO_3$ | 40 | 1/32 |
|  | Capric acid | 44 |  |
|  | Succinimide | 14 |  |
| $H_2O$ | $CrO_3$ | 40 | 0/32 |
|  | 1,2,3-propanetricarboxylic acid. | 15.14 |  |
|  | Succinimide | 4.76 |  |
| t-Butyl alcohol. | $CrO_3$ | 40 | 1/32 |
|  | 2-ethylbutyric acid | 29.4 |  |
|  | Succinimide | 7.5 |  |
| $H_2O$ | $CrO_3$ | 40 | 0.5/32 |
|  | Aconitic acid | 14.74 |  |
|  | Succinimide | 7.5 |  |
| t-Butyl alcohol. | $CrO_3$ | 40 | 1/32 |
|  | Cyclohexanecarboxylic acid. | 32.5 |  |
|  | Succinimide | 7.5 |  |
| Do | $CrO_3$ | 80 | 1/32 |
|  | Cyclohexanecarboxylic acid. | 32.6 |  |
|  | Succinimide | 7.5 |  |
| $H_2O$ | $CrO_3$ | 40 | 0.5/32 |
|  | Propionic acid | 11.2 |  |
|  | Gamma-butyrolactam | 6.4 |  |

These results show the enhanced performance available with coating compositions of the present invention as compared with a chromic acid-adipic acid-succinimide composition under salt spray test conditions.

Example 3.—The condensing humidity test described hereinabove is conducted on two panels. However, the test is terminated and the panels removed from the cabinet when incipient coating failure is detected by visual inspection of the panels maintained in the cabinet. One panel is coated with a coating composition containing 40 g./l. (grams per liter) chromic acid, 71.6 g./l. linoleic acid, and 7.5 g./l. succinimide. As a basis for comparison, the coating composition for the other panel is made up from 40 g./l. of chromic acid, 20 g./l. adipic acid, and 10 g./l. succinimide.

The wetting agent of Example 1 is present in both compositions in an amount of apout 0.2 milliliter per liter. The compositions are applied and cured in the manner described hereinabove. Both panels demonstrate incipient coating failure after three hours and therefore are removed from the cabinet. Hence, the coating from the composition containing the unsaturated monobasic acid successfully demonstrates equivalent coating protection in condensing humidity when compared with a coating from a dibasic-acid-containing coating composition which latter composition offers the good corrosion resistance demonstrated in the salt spray test of Example 2.

It is to be understood that, although the invention has been described with specific reference to particular embodiments thereof, it is not to be so limited, since changes and alterations therein may be made which are within the full intended scope of this invention as defined by the appended claims.

We claim:
1. A corrosion-inhibiting, hexavalent-chromium-containing coating composition for metal surfaces which consists essentially of a volatile liquid having dispersed therein:
  (A) chromic acid in a concentration of between about 1 and 400 grams per liter; and
  (B) an organic component which is composed of:
    (1) between about 60–90 weight percent of at least one non-aromatic carboxylic compound selected from the group consisting of carboxylic acids, anhydrides thereof, where such exist, and ammonium salts thereof where such exist, wherein said acids are selected from the group consisting of saturated and unsaturated monocarboxylic acids, saturated and unsaturated polycarboxylic acids having at least three carboxyl groups per molecule, and mixtures thereof; and (2) between about 10-40 weight percent of at least one compound selected from the group consisting of:
  (a) amino acids free from substituents selected from the group consisting of sulphur, hydroxyl, and halogen;
  (b) compounds of the structure:

R—CONHR' 

wherein R and R' are the same or different and R is selected from the group consisting of alkyl, cycloalkyl, alkenyl, aryl, carbamyl, alkaryl, carbamyl substituted hydrocarbon, carboxyl substituted hydrocarbon, and aralkyl, and R' is selected from the group consisting of alkyl, cycloalkyl, hydrogen, alkenyl, aryl, alkaryl, and aralkyl; and
  (c) compounds having a heterocyclic ring containing at least one nitrogen atom and at least one carbon atom, with the remaining ring atoms being selected from the group consisting of carbon and nitrogen, and (i) with each substituted ring nitrogen atom bearing a radical represented by said R' defined hereinabove, and (ii) wherein ring carbon atoms bear radicals selected from the group consisting of alkoxy, oxo, amino, said R' as defined hereinabove, and the radical of the formula

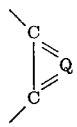

wherein the carbon atoms are heterocyclic ring carbon atoms and taken together with Q complete an aromatic ring;
wherein the total weight of compounds from said (B) component is from about 1 to 100 grams per liter of the coating composition, with the mole ratio of $CrO_3$ to the total of said (B) component compounds being within the range of about 5:1 to about 0.7:1.

2. The bonding coating composition of claim 1 wherein said saturated monocarboxylic acids are selected from the group consisting of branched chain monocarboxylic acids, $C_2$–$C_{30}$ fatty acids, alicyclic acids, and mixtures of same, and said saturated polycarboxylic acids are selected from the group consisting of tricarballylic acid, 1,3,5-tricarboxypentane, polyacrylic acids, ethylene-maleic anhydride copolymers, and mixtures thereof.

3. The bonding coating composition of claim 1 wherein said unsaturated monocarboxylic acids are selected from the group consisting of mono-, di-, tri-, and polyethenoid fatty acids, ethyoid fatty acids, and mixtures of same.

4. The bonding coating composition of claim 1 wherein said amino acid is an alpha-amino acid selected from the group consisting of monoamino-monocarboxylic acids, monoamino-dicarboxylic acids, diamino-monocarboxylic acids, heterocyclic amino acids, and their mixtures.

5. The bonding coating composition of claim 1 wherein said group (b) compounds are selected from the group consisting of acrylamide, methacrylamide, propionamide, N-phenylpropionamide, N-methylacetamide, succinamide, oxamide, hexaneamide, N-methylhexaneamide, benzamide, N-ethylbenzamide, N-phenylbenzamide, and their mixtures.

6. The bonding coating composition of claim 1 wherein said group (c) compounds are selected from the group consisting of carbostyril, phthalimidine, pyrazole, 4-methoxypyridine, barbituric acid, succinimide, isatin, uramil, oxindole, uracil, 1,2,4-triazole, 2,5-piperazinedione, pyrrole, caprolactam, N-methylisatin, N-ethylpyrrole, gamma-butyrolactam, 2-pyrrolidone, p-methylisatin, delta-valerolactam, 6-methyl-2-piperidone, omega-lauric lactam, and mixtures of same.

7. The method of protecting a metal substrate surface with an adherent, corrosion resistant, hexavalent-chromium-containing coating composition, which method comprises applying to said surface a hexavalent-chromium-containing coating composition supplying an amount, after vaporization of volatile substituents from the applied composition, not substantially in excess of about 600 milligrams of composition residue per square foot of surface, and heating said substrate at a temperature, and for a period of time, sufficient to vaporize volatile substituents from said composition and deposit on said surface said residue at least substantially bonded to said surface, wherein said coating composition comprises a volatile liquid having dispersed therein:

(A) chromic acid in a concentration of between about 1 and 400 grams per liter; and
(B) an organic component which is composed of:
  (1) between about 60-90 weight percent of at least one non-aromatic carboxylic compound selected from the group consisting of carboxylic acids, anhydrides thereof, where such exist, and ammonium salts thereof where such exist, wherein said acids are selected from the group consisting of saturated and unsaturated monocarboxylic acids, saturated and unsaturated polycarboxylic acids having at least three carboxyl groups per molecule, and mixtures thereof; and
  (2) between about 10-40 weight percent of at least one compound selected from the group consisting of:
    (a) amino acids free from substituents selected from the group consisting of sulphur, hydroxyl, and halogen;
    (b) compounds of the structure:

R—CONHR' 

wherein R and R' are the same or different and R is selected from the group consisting of alkyl, cycloalkyl, alkenyl, aryl, carbamyl, alkaryl, carbamyl substituted hydrocarbon, carboxyl substituted hydrocarbon, and aralkyl, and R' is selected from the group consisting of alkyl, cycloalkyl, hydrogen, alkenyl, aryl, alkaryl, and aralkyl; and
    (c) compounds a heterocyclic ring containing at least one nitrogen atom and at least one carbon atom, with the remaining ring atoms being selected from the group consisting of carbon and nitrogen, and (i) with each substituted ring nitrogen atom bearing a radical represented by said R' defined hereinabove, and (ii) wherein ring carbon atoms bear radicals selected from the group consisting of alkoxy, oxo, amino, said R' as defined hereinabove, and the radical of the formula

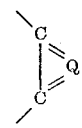

wherein the carbon atoms are heterocyclic ring carbon atoms and taken together with Q complete an aromatic ring;

wherein the total weight of compounds from said (B) component is from about 1 to 100 grams per liter of the coating composition, with the mole ratio of $CrO_3$ to the total of said (B) component compounds being within the range of about 5:1 to about 0.7:1.

8. The method of claim 7 wherein said substrate is seated at a temperature maintained within the range from about 210° F. to about 550° F. and for a time of at least about 5 seconds.

9. The method of claim 8 wherein volatile components of said coating composition are at least in part evaporated from the applied composition prior to said heating and said residue is present on said surface after heating in an amount of at least about 5 milligrams per square foot.

10. A coated metal substrate comprising a coating on the surface of said substrate of between about 5–600 milligrams per square foot of the residue obtained upon heating an applied corrosion-resistant, hexavalent-chromium-containing coating composition at a temperature, and for a period of time, sufficient to vaporize volatile substituents from said coating composition and deposit said residue at least substantially bonded to said surface, wherein said coating composition comprises:

(A) chromic acid in a concentration of between about 1 and 400 grams per liter; and
(B) an organic component which is composed of:
  (1) between about 60–90 weight percent of at least one non-aromatic carboxylic compound selected from the group consisting of carboxylic acids, anhydrides thereof, where such exist, and ammonium salts thereof where such exist, wherein said acids are selected from the group consisting of saturated and unsaturated monocarboxylic acids, saturated and unsaturated polycarboxylic acids having at least three carboxyl groups per molecule, and mixtures thereof; and
  (2) between about 10–40 weight percent of at least one compound selected from the group consisting of:
    (a) amino acids free from substituents selected from the group consisting of sulphur, hydroxyl, and halogen;
    (b) compounds of the structure:
      R—CONHR' wherein R and R' are the same or different and R is selected from the group consisting of alkyl, cycloalkyl, alkenyl, aryl, carbamyl, alkaryl, carbamyl substituted hydrocarbon, carboxyl substituted hydrocarbon, and aralkyl, and R' is selected from the group consisting of alkyl, cycloalkyl, hydrogen, alkenyl, aryl, alkaryl, and aralkyl; and
    (c) compounds having a heterocyclic ring containing at least one nitrogen atom and at least one carbon atom, with remaining ring atoms being selected from the group consisting of carbon and nitrogen, and (i) with each substituted ring nitrogen atom bearing a radical represented by said R' defined hereinabove, and (ii) wherein ring carbon atoms bear radicals selected from the group consisting of alkoxy, oxo, amino, said R' as defined hereinabove, and the radical of the formula

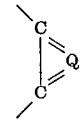

wherein the carbon atoms are heterocyclic ring carbon atoms and taken together with Q complete an aromatic ring;

wherein the total weight of compounds from said (B) component is from about 1 to 100 grams per liter of the coating composition, with the mole ratio of $CrO_3$ to the total of said (B) component compounds being within the range of about 5:1 to about 0.7:1.

References Cited
UNITED STATES PATENTS

| | | | |
|---|---|---|---|
| 2,393,663 | 1/1946 | Thomas et al. | 148—6.2 |
| 2,480,448 | 8/1949 | Coates | 148—6.21 |
| 2,559,812 | 7/1951 | Watson | 148—6.2 |
| 2,793,932 | 5/1957 | Kahler et al. | 106—14 X |
| 2,887,418 | 5/1959 | Whitby | 148—6.2 |
| 2,927,046 | 3/1960 | Andrade | 106—14 X |
| 3,382,081 | 5/1968 | Cutter et al. | 148—6.2 X |

RALPH S. KENDALL, Primary Examiner

U.S. Cl. X.R.

106—14